Patented Sept. 11, 1945

2,384,564

UNITED STATES PATENT OFFICE 2,384,564

MAGNESIUM SILICATE SUSPENSIONS AND PROCESS FOR MAKING SAME

Reuben Roseman and Harry Eisenberg, Baltimore, Md., assignors, by mesne assignments, to Charles H. Burton, Baltimore, Md.

No Drawing. Application February 26, 1941,
Serial No. 380,633

4 Claims. (Cl. 252—317)

This invention relates to magnesium silicate suspensions and to a process for making these suspensions.

Within the last few years, silicates of magnesium, largely through the work of N. Mutch in England and M. B. Levin and co-workers in this country, have achieved considerable importance in the treatment of peptic ulcer and gastric hyperacidity. The gratifying clinical results obtained with these materials attest to their excellent antacid, adsorptive, and antidigestant qualities.

For the most part, the afore-mentioned magnesium silicates have been available in powder and tablet form; although recently aqueous suspensions of powdered magnesium trisilicate ($2MgO.3SiO_2.nH_2O$) have made their appearance on the market. It is with magnesium silicate suspensions that this invention is concerned, the object being the preparation of products of physical and pharmaceutical elegance, possessing distinct advantages over prior art materials. Among these advantages may be listed: the ease of direct administration, in uniform, accurate doses, of our products (as compared with the unpleasant chewing and difficulty of disintegration associated with tablets; and the necessity of first suspending powders in water, plus the lack of dosage accuracy with these powders because of the difference in densities of different brands); their non-settling characteristics; their lack of grittiness; their gelatinous, active nature; and their materially lower cost of production.

Our discovery had its origin in an observation of an unlooked-for phenomenon which we made in the course of attempts we were making to lower the pH of precipitated and washed silicates of magnesium, with the view of increasing their adsorptive powers for such materials as methylene blue. We observed that the passage of carbon dioxide through fluid suspensions of these silicates in water did in fact lower the pH, but at the same time we made the surprising observation that the suspensions no longer were free-flowing liquid or fluid suspensions as we expected them to be, but instead, to our surprise, had "set up" or gelled. On further investigation of this phenomenon, the resulting gels were found to be thixotropic (see H. Freundlich, "Thixotropy," No. 267 of "Actualités scientifiques et industrielles," Hermann et Cie, Paris, 1935), that is, capable of an isothermal, reversible sol-gel transformation, being liquefied on shaking and setting spontaneously.

Thus, within one and one-half minutes following the treatment of 10 cc. of an 8.1% suspension of $MgO,1.6SiO_2$ (pH9.3) with a rapid stream of carbon dioxide for one-half minute, the originally fluid suspension had "set up," so that the test-tube (16 by 150 mm.) containing it could be inverted without flow taking place. Vigorous shaking of the solidified material (pH7.2) produced liquefaction; upon standing undisturbed, spontaneous reversion to the gel state occurred in less than a minute. The process could be repeated indefinitely.

Similar observations were made with suspensions of $MgO,1.1SiO_2$ (6.1%) and $MgO,3.6SiO_2$ (8.4%).

The magnesium silicates were prepared by slowly adding water solutions of various silicates of sodium to water solutions of approximately equimolecular proportions of magnesium sulfate (see Journal of the American Chemical Society, 62, 676 (1940)), with vigorous stirring. The resulting precipitates were collected and washed in a filter press, and portions of the wet products were ground with water for a few minutes in a mortar to yield the rather coarse suspensions which, after vigorous shaking, were employed in the above experiments.

Subsequently it was found that hydrochloric acid, sulfuric acid, or acetic acid, among other acids, in small amounts, could be substituted for carbon dioxide in the above experiments, to give similar results. Thus, following the addition of 0.4 cc. of N hydrochloric acid (0.0004 mole) to 10 cc. of an 8.1% suspension of $MgO,1.6SiO_2$ (0.006 mole; pH9.3), contained in a 16 by 150-mm. test-tube, gelatination occurred in about half a minute. The setting time of the thixotropic product (pH7.7) was less than fifteen seconds.

In general, other things being equal, the larger the proportion of gelling agent (within limits), or the more concentrated the suspension of magnesium silicate, the more rapidly is the gel formed, and the smaller is the setting time of the thixotropic product.

From the foregoing exposition it will be clear that our process employs precipitated and washed magnesium silicates (wet), and so eliminates the drying and grinding operations inherent in the production of the powdered materials used in suspensions of the prior art.

Furthermore, the products of our invention are, by their very nature, gritless, a condition seldom achieved in suspensions of the prior art, by reason of the difficulty in grinding dried, synthetic magnesium silicates to impalpability.

In addition, our preparations are non-settling for, being thixotropic, they "set up" or become rigid on standing. It is true that our thixotropic gels, in common with other gels, synerize, and so, on standing for extended periods, extrude small amounts of clear fluid; but preparations heretofore available settle considerably, some showing upwards of one-fourth their volume of clear supernatant fluid.

Other advantages claimed for our previously described products include their lower pH and their superior adsorptive qualities for such materials as methylene blue.

By way of further illustrating our invention, the following is a detailed description of an actual process developed and used by us for preparing a thixotropic gel of magnesium trisilicate

(2MgO:3SiO₂)

intended for use in the treatment of peptic ulcer and gastric hyperacidity.

A magnesium sulfate solution ($t=16°$ C.) was prepared by dissolving 3220 g. U. S. P.

MgSO₄.7H₂O in 16,100 g. H₂O.

A sodium silicate solution was prepared in the following manner: to 8000 g. H₂O contained in an enameled vessel were added (in the order given) 4000 g. of a well-known brand of sodium silicate, holding 8.9% Na₂O and 28.0% SiO₂, and free of arsenic and lead; 565 g. C. P. NaOH, first dissolved in 1000 g. H₂O; and finally, 3000 g. H₂O (rinsings). The whole was mixed thoroughly ($t=26°$ C.).

To the magnesium sulfate solution (contained in a 20-gallon enameled tank) the sodium silicate solution was added as rapidly as possible, with high-speed stirring. The sodium silicate container was rinsed with 2000 g. H₂O, this rinsing being then added to the mix. High-speed stirring was continued for 15 minutes, when a smooth, creamy suspension resulted ($t=20°$ C.; pH=9.4).

After collection in a filter press (or by vacuum, on a large Büchner funnel or Moore leaf-filter), the precipitate was washed until the filtrate showed but very faint tests, if any, for Na⁺ (with uranyl zinc acetate) and SO₄⁻⁻ (with BaCl₂,HCl).

A portion of the washed filter cake, running about 21% solids, and possessing a firm, white appearance, was placed in a large mortar, and ground by hand, with the aid of a pestle. Here, an interesting phenomenon is observed: the solid cake is gradually liquefied, to yield a thick but freely flowing soup. 2705 g. of the liquefied material were admixed with 2030 g. H₂O, and the mixture homogenized in an Eppenbach homogenizer to give a suspension holding 12.1% solids (pH9.5). 200 g. of this suspension, contained in a cylindrical bottle (diameter=2¼″), were treated with 7.4 cc. of NHCl (corresponding to but one-fiftieth the total amount of acid which the magnesium trisilicate is theoretically capable of neutralizing); gelatination occurred in about half an hour, the pH of the thixotropic product being 8.1.

The gel was flavored with peppermint oil, to taste, whereupon it was ready for therapeutic use.

We record, in passing, that while an untreated suspension of precipitated and washed magnesium trisilicate settles out considerably on standing, leaving a sediment difficult to resuspend by shaking, the corresponding treated (thixotropic) suspension of our invention remains homogeneous permanently, and may easily be rendered fluid, prior to administration, by shaking.

It will be understood that while the above is an example of the application of our invention to the obtainment of products useful in peptic ulcer therapy and in the treatment of gastric hyperacidity, these products are likewise useful as: suspending agents for other materials, such as barium sulfate, in X-ray studies of the gastro-intestinal tract; major components of dentifrices, where they may also act as suspending and/or thickening agents for calcium carbonate, calcium phosphates, magnesium hydroxide, and similar dentifrice ingredients; et cetera.

Furthermore, variations from the above process may be made without departing from the scope of our invention, and it is intended that the above description shall be interpreted as an illustration and not in a limiting sense.

Thus, the magnesium salt and alkali metal silicate may be employed in dilute or concentrated solutions, hot or cold; the silicate solution may be added to the magnesium salt solution or vice versa, slowly or rapidly, or precipitation may be simultaneous; the stirring may be vigorous, as by motor, or weak, as by hand; and the precipitated mix may be heated to boiling for an extended period (which, we have discovered, results in a noteworthy drop in the pH), or need not be heated at all. At this point, it may not be amiss to record our observations that the application of heat, in the course of preparing the precipitated and washed magnesium silicates, favors the formation of products of enhanced thixotropic potentialities (from the standpoint of our invention), and which exhibit an accentuated lag in their rate of reaction with dilute hydrochloric acid.

Moreover, while hydrochloric acid was employed as gelling agent in the above example, we have found that a wide variety of other acids (in addition to those previously mentioned: sulfuric acid, acetic acid, and carbonic acid or carbon dioxide), as well as—surprisingly enough—salts, are likewise effective. Thus, treatment of portions (10 cc.) of the fluid, 12.1% suspension of magnesium trisilicate with relatively small proportions of Nitric acid
Lactic acid
Malonic acid
Tartaric acid
Mandelic acid
Salicylic acid [1]
Acetylsalicylic acid (aspirin) [1]
Diethylbarbituric acid (barbital) [1]
Nicotinic acid
Thiamine hydrochloride (vitamin B₁ hydrochloride)
Aluminum hydroxide gel ("amphojel," a brand of this amphoteric material)
Lithium sulfate
Sodium sulfate
Sodium bicarbonate
Sodium acetate [2]
Sodium tungstate
Potassium chloride
Potassium bromide
Potassium iodide
Potassium thiocyanate
Potassium sodium tartrate (Rochelle salt)
Silver nitrate [2]
Magnesium chloride
Magnesium sulfate
Basic magnesium carbonate
Ammonium chloride [2]
Ammonium sulfate
Sodium chloride [2]
Calcium chloride
Aluminum sulfate
Manganous sulfate and ferric chloride ---
[1] Alcoholic solution.
[2] E. g., 0.2 cc. of a 2M solution.

gave gels which could be liquefied by shaking or stirring, the liquefied materials spontaneously reverting to the gel state on standing undisturbed. Numerous other acidic, neutral, and basic substances, also, will be found to be similarly effective in embodying the broad and fundamental nature of our discovery.

On still further investigation it was also found by us that non-electrolytes, such as cane sugar and alcohol, and bases, such as potassium hydroxide and sodium hydroxide, were not effective in producing our thixotropic gels. From this we were led to the further concept that use of electrolytes of the acid or salt types was essential for the purpose.

Another manner of embodying the fundamental principle of our discovery is to incompletely wash our precipitated magnesium silicates, thereby allowing of the presence in the filter cakes of some gel-producing electrolyte, such as sodium sulfate, and to subsequently suspend the incompletely washed precipitates in water.

There remains to be mentioned the interesting case of where a magnesium silicate precipitate was obtained by the interaction of water solutions of magnesium sulfate and the crystalline, molecular compound, sodium metasilicate pentahydrate ($Na_2SiO_3.5H_2O$), in equimolecular proportions: a fluid, aqueous suspension of the washed precipitate could be gelled by the process of our invention (with carbon dioxide, hydrochloric acid, or aluminum sulfate, for example).

The invention or discovery as hereinabove set forth is embodied in particular form and manner but the invention or discovery may be variously embodied within the scope of the following claims.

We claim:
1. A process for preparing a thixotropic gel of magnesium silicate which comprises the steps of: producing a precipitate of magnesium silicate by interacting a soluble magnesium salt with an alkali metal silicate, washing the precipitate substantially free of salts, suspending the washed precipitate in water, and adding to the fluid suspension at least one of the gel-producing electrolytes of the group consisting of acids and salts in an amount to produce a thixotropic gel, and maintaining the so set up gel as a thixotropic gel capable of subsequent alternate liquefaction on shaking and setting up spontaneously into a rigid gel upon standing undisturbed.

2. A process for preparing a thixotropic gel of magnesium trisilicate which comprises the steps of: producing a precipitate of magnesium trisilicate by interacting a soluble magnesium salt with an alkali metal silicate, washing the precipitate substantially free of salts, suspending the washed precipitate in water, and adding to the fluid suspension a relatively small proportion of at least one of the gel-producing electrolytes of the group consisting of acids and salts, the proportion being less than that required by the stoichiometric relation with the magnesium trisilicate, to produce a thixotropic gel, capable of subsequent alternate liquefaction on shaking and setting up spontaneously into a rigid gel upon standing undisturbed.

3. The product resulting from the process of claim 1.

4. The product resulting from the process of claim 2.

REUBEN ROSEMAN.
HARRY EISENBERG.

Certificate of Correction

Patent No. 2,384,564. September 11, 1945.

REUBEN ROSEMAN, ET AL.

It is hereby certified that error appears in the printed specification of the above numbered patent requiring correction as follows: Page 3, second column, lines 11 to 13, claim 1, strike out the words "and maintaining the so set up gel as a thixotropic gel"; and that the said Letters Patent should be read with this correction therein that the same may conform to the record of the case in the Patent Office.

Signed and sealed this 29th day of October, A. D. 1946.

[SEAL]

LESLIE FRAZER,
*First Assistant Commissioner of Patents.*